(12) United States Patent
Huang

(10) Patent No.: US 8,059,399 B2
(45) Date of Patent: Nov. 15, 2011

(54) DISPLAY DEVICE

(75) Inventor: Hsieh-Ting Huang, Miao-Li (TW)

(73) Assignee: Chimei Innolux Corporation, Miao-Li County (TW)

( * ) Notice: Subject to any disclaimer, the term of this patent is extended or adjusted under 35 U.S.C. 154(b) by 78 days.

(21) Appl. No.: 12/587,151

(22) Filed: Oct. 1, 2009

(65) Prior Publication Data

US 2010/0090569 A1    Apr. 15, 2010

(30) Foreign Application Priority Data

Oct. 10, 2008   (CN) .......................... 2008 1 0216735

(51) Int. Cl.
    *G06F 1/16*      (2006.01)
(52) U.S. Cl. ......... 361/679.59; 361/679.21; 361/679.22; 248/176.1; 248/917; 248/918; 312/223.1; 312/223.2
(58) Field of Classification Search .............. 361/679.59
See application file for complete search history.

(56) References Cited

U.S. PATENT DOCUMENTS

| | | | | |
|---|---|---|---|---|
| 5,144,290 | A | * | 9/1992 | Honda et al. .................. 345/156 |
| 5,584,105 | A | * | 12/1996 | Krauss ............................ 24/614 |
| 6,400,560 | B1 | * | 6/2002 | Chian ....................... 361/679.27 |
| 7,099,148 | B2 | * | 8/2006 | Lee .......................... 361/679.21 |
| 7,193,843 | B2 | * | 3/2007 | Hsu .......................... 361/679.21 |
| 7,631,843 | B2 | * | 12/2009 | Makino ...................... 248/176.1 |
| 7,673,838 | B2 | * | 3/2010 | Oddsen et al. ............. 248/278.1 |
| 7,706,139 | B2 | * | 4/2010 | Kim ......................... 361/679.21 |
| 7,742,288 | B2 | * | 6/2010 | Min et al. ................. 361/679.21 |
| 2006/0203438 | A1 | * | 9/2006 | Chiu et al. .................... 361/681 |
| 2006/0227499 | A1 | * | 10/2006 | Jeong et al. ................... 361/681 |
| 2007/0064378 | A1 | * | 3/2007 | Lo et al. ....................... 361/681 |

FOREIGN PATENT DOCUMENTS

CN          2824508 Y      10/2006

* cited by examiner

*Primary Examiner* — Jinhee Lee
*Assistant Examiner* — Anthony Q Edwards
(74) *Attorney, Agent, or Firm* — Altis Law Group, Inc.

(57) ABSTRACT

A display device includes a main body and a support assembly. The main body includes a liquid display module, four fixed pieces, and a housing to receive the liquid display module. The housing includes four latching units. The support assembly is to support the main body. Each of the fixed pieces is fixed to the main body and the support assembly to connect the main body with the support assembly. Part of each latching unit is deformable to allow passage thereby of one fixed piece, whereby the fixed pieces are fixed to the main body.

13 Claims, 13 Drawing Sheets

(REATED ART)

(REATED ART)

DISPLAY DEVICE

CROSS-REFERENCE TO RELATED APPLICATION

This application is related to, and claims the benefit of, a foreign priority application filed in China as Application No. 200810216735.2 on Oct. 10, 2008. The related application is incorporated herein by reference.

BACKGROUND

1. Technical Field

The present disclosure generally relatives to display devices and, particularly, to a liquid crystal display device.

2. Description of Related Art

Liquid crystal display devices, as a kind of panel display device, are widely used for their high brightness, small weight, and low energy consumption.

Referring to FIG. 11, a commonly used display device 10 is shown. The display device 10 includes a main body 11, a support assembly 12, and four fasteners 13. The support assembly 12 is fixed to the main body 11 by the fasteners 13, providing support thereto. The main body 11 includes four fixed pieces 14, a front frame 15, a liquid crystal module 16, and a rear frame 17. The support assembly 12 includes a base 121, a bracket 122, and a mounting plate 123. The bracket 122 is fixed to the base 121 and the mounting plate 123. The mounting plate 123 defines four through holes 124. The rear frame 17 defines four through holes 171 and eight fixing posts 172. The fixed piece 14 defines two fixing holes 141 and a threaded hole 142.

To mount the fixed pieces 14 to the rear frame 17, the fixing posts 172 pass through the fixing holes 141 and are heated and pressed. Once cooled, the fixing posts 172 are immovable in the fixing holes 141, thus the fixed pieces 14 are fixed on the rear frame 17. After that, the fasteners 13 pass through the through holes 124 and the through holes 171, and are received in the threaded holes 142 of the fixed pieces 14. As such, the main body 11 is fixed to the support assembly 12.

However, the heating and pressing process fixing the fixed pieces 14 to the rear frame 17 requires specific apparatus, and thus assembly of the display device 10 is relatively complex and costly. In addition, the heating and pressing process is very complex, and parameters such as temperature and pressure are difficult to control, possibly affecting product quality.

Therefore, a new display device is desired to overcome the above-described shortcomings.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
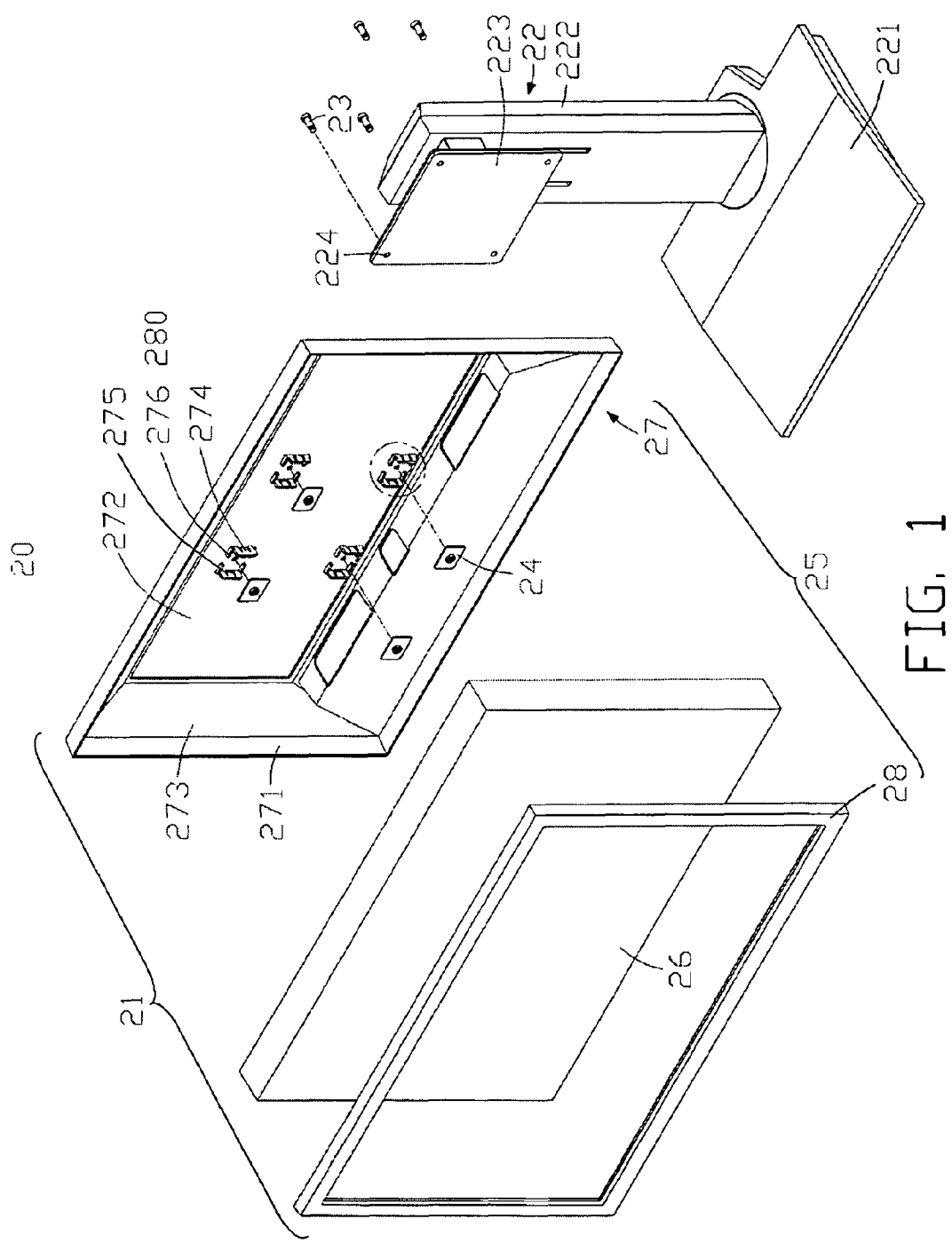
FIG. 1 is an exploded, isometric view of a first embodiment of a display device, the display device including a front cover, a fixed piece and a rear cover.

Referring to FIG. 1, a first embodiment of a display device 20 is shown. In the illustrated embodiment, the display device 20 is a liquid crystal display, although the display device 20 may be of other type. The display device 20 includes a main body 21, a support assembly 22, and at least one fastener 23. The support assembly 22 is fixed to the main body 21 by the at least one fastener 23, providing support thereto. In the illustrated embodiment, four fasteners 23, here threaded nuts, are used.

The main body 21 includes at least one fixed piece 24, a housing 25, and a liquid crystal module 26. The housing 25 includes a front cover 28 and a rear cover 27 enclosing the fixed pieces 24 and the liquid crystal module 26. In the illustrated embodiment, four fixed pieces 24 are used.

The support assembly 22 includes a base 221, a bracket 222, and a mounting plate 223. One end of the bracket 222 is fixed on the base 221, and an opposite end of the bracket 222 is fixed to the mounting plate 223. The rear cover 27 is fixed to the mounting plate 223, thus fixing the main body 21 to the support assembly 22. The mounting plate 223 defines at least one mounting hole 224, with four mounting holes 224 used here.

The rear cover 27 includes four sidewalls 271 connected end-to-end, a protruding portion 272, four connecting portions 273, and four latching units 280. The connecting portions 273 connect the sidewalls 271 with the protruding portion 272. Alternatively, the rear cover 27 may be other shapes, for example, three sidewalls 271 and three connecting portions 273 or more than four sidewalls 271 and more than four connecting portions 273. One or more latching units 280 may also be used. The latching units 280 are fixed to an inner side of the protruding portion 272, such that the latching units 280 and the sidewalls 271 are on the same side of the protruding portion 272. Each latching unit 280 includes two latching pieces 274, four blocks 275, and a fixing hole 276 between the latching pieces 274. The fixing holes 276 of the latching units 280 correspond to the four mounting holes 224. Each of two ends of each latching piece 274 forms a block 275. The rear cover 27 is made of plastic in this embodiment. Two or more latching pieces 274 may be used.

Figure 2:
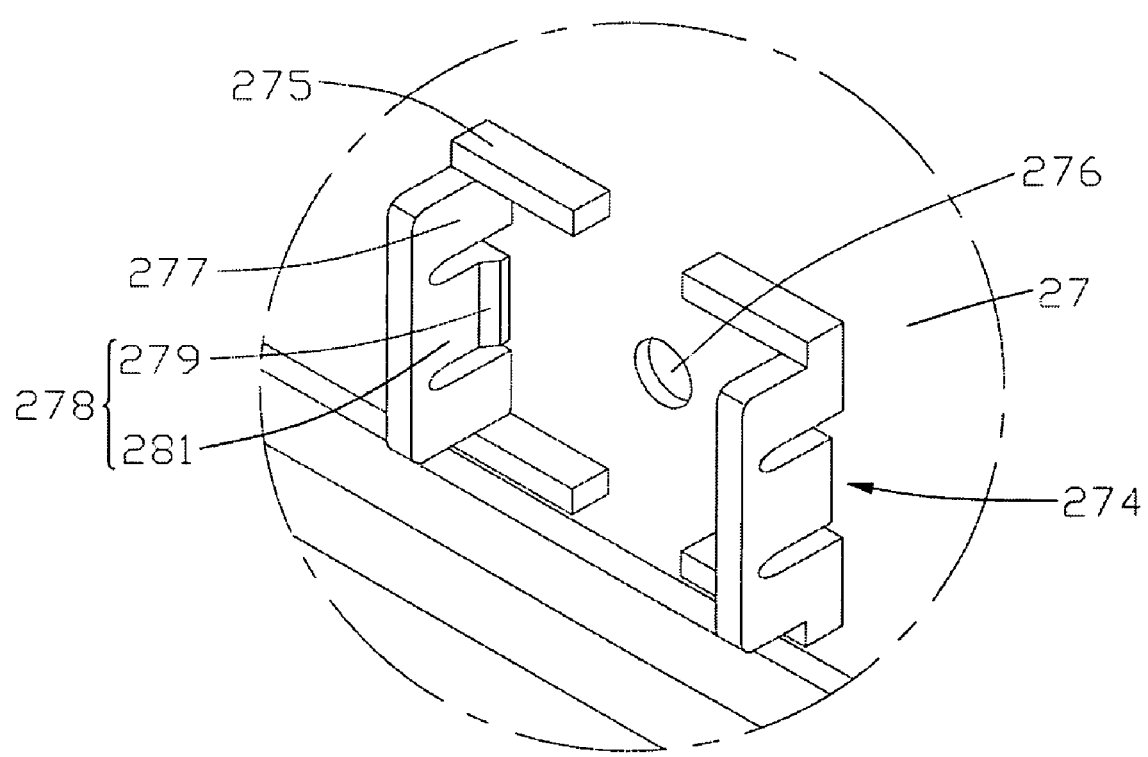
FIG. 2 is an enlarged, partial view of the rear cover of FIG. 1.

Referring to FIG. 2, each latching piece 274 includes a base portion 277 with a gap in the middle and an elastic deformable portion 278 extending from the base portion 277 in the gap, thus forming a M-shaped latching piece 274. That is, the base portion 277 includes two legs (not labeled) spaced from each other and the deformable portion 278 is disposed between the legs. The deformable portion 278 includes a root 281 connected to the base portion 277 and a hook 279 formed at a free end of the root 281. The hook 279 protrudes towards another latching piece 274 of the latching unit 280. The hook 279 does not touch the protruding portion 272, thus defining a gap therebetween. That is, the deformable portion 278 is shorter than the base portion 277. Each latch piece 274 and each two latch blocks 275 cooperatively define a receptacle to receive a corresponding fixed piece 24.

Figure 3:
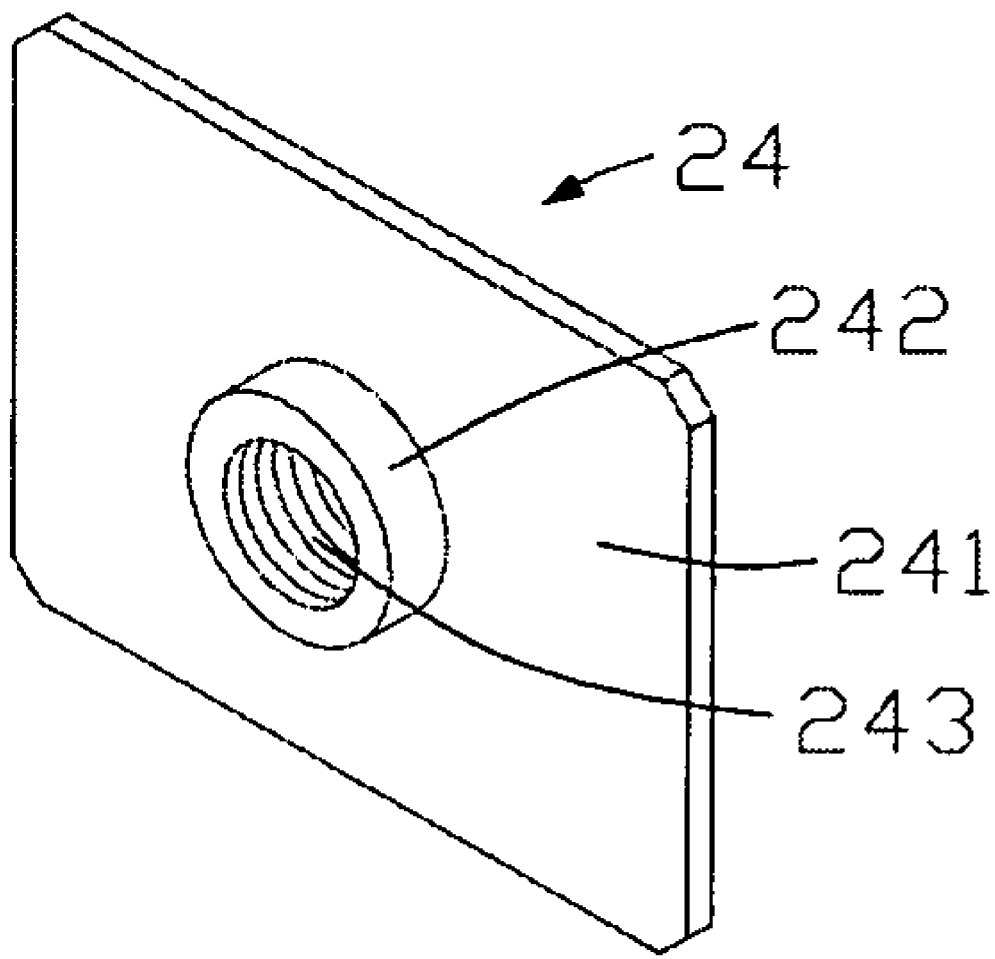
FIG. 3 is an isometric view of the fixed piece of FIG. 1.

Referring to FIG. 3, the fixed piece 24 includes a plate 241 and a protrusion 242 formed on the plate 241. In the illustrated embodiment, the fixed piece 24 is a metallic plate. The protrusion 242 defines a fastening hole 243. The fastening hole 243 may be threaded. The fastening hole 243 has a diameter corresponding to that of the fixing hole 276 and the mounting hole 224.

Figure 4:
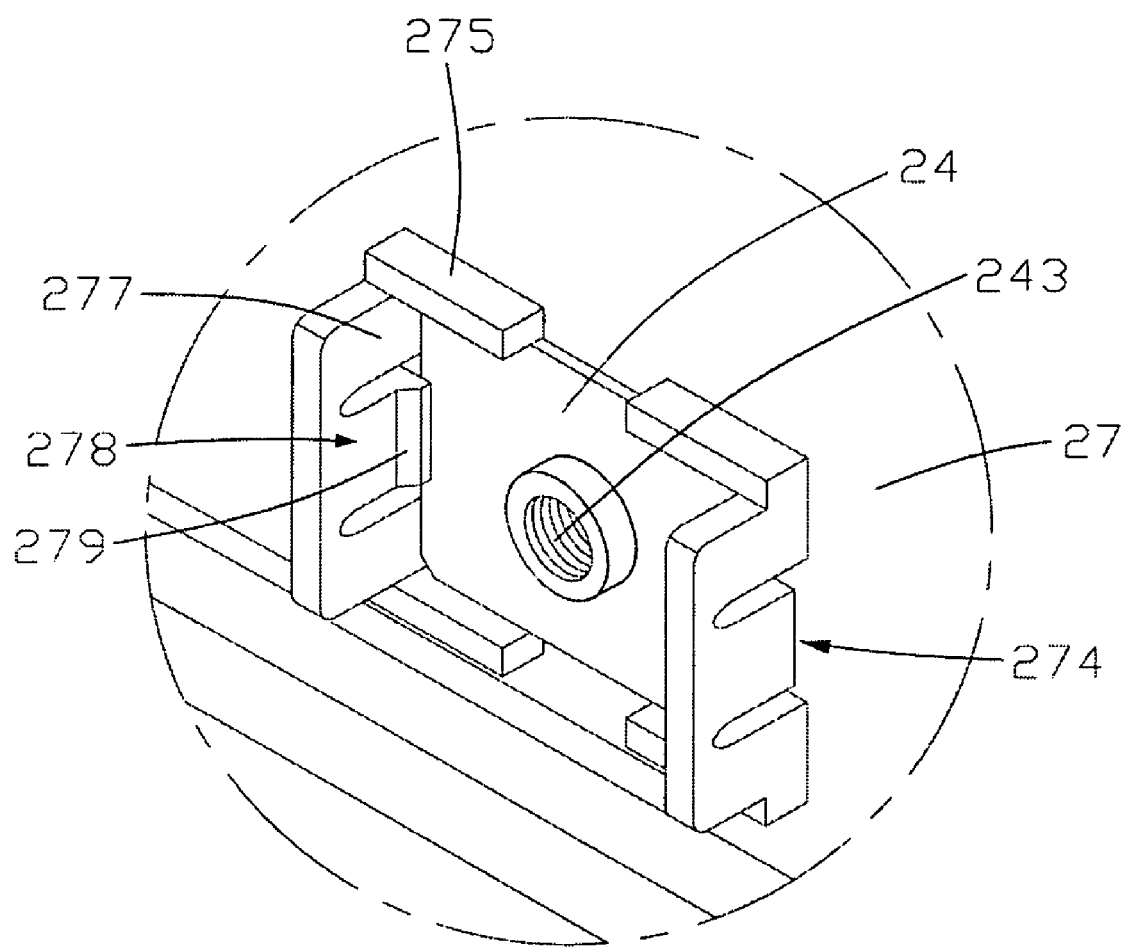
FIG. 4 is an assembled, isometric view of the display device of FIG. 1.

Referring to FIG. 4, during assembly of the fixed pieces 24 to the rear cover 27, each of the fixed pieces 24 is positioned between the latching pieces 274 of one latching unit 280. The fixed piece 24 is pressed towards the protruding portion 272 and deforms the deformable portions 278, such that the fixed piece 24 can pass thereby. Once passed by the fixed pieces 24, the deformable portions 278 return to their original state. The base portions 277 resist ends of the fixed piece 24. The base portions 277, the blocks 275 and the deformable portions 278 prevent the fixed piece 24 from moving in any direction, and as such, the fixed piece 24 is held by the latching unit 280. At this time, the fastening hole 243 aligns to the fixing hole 276.

Figure 5:
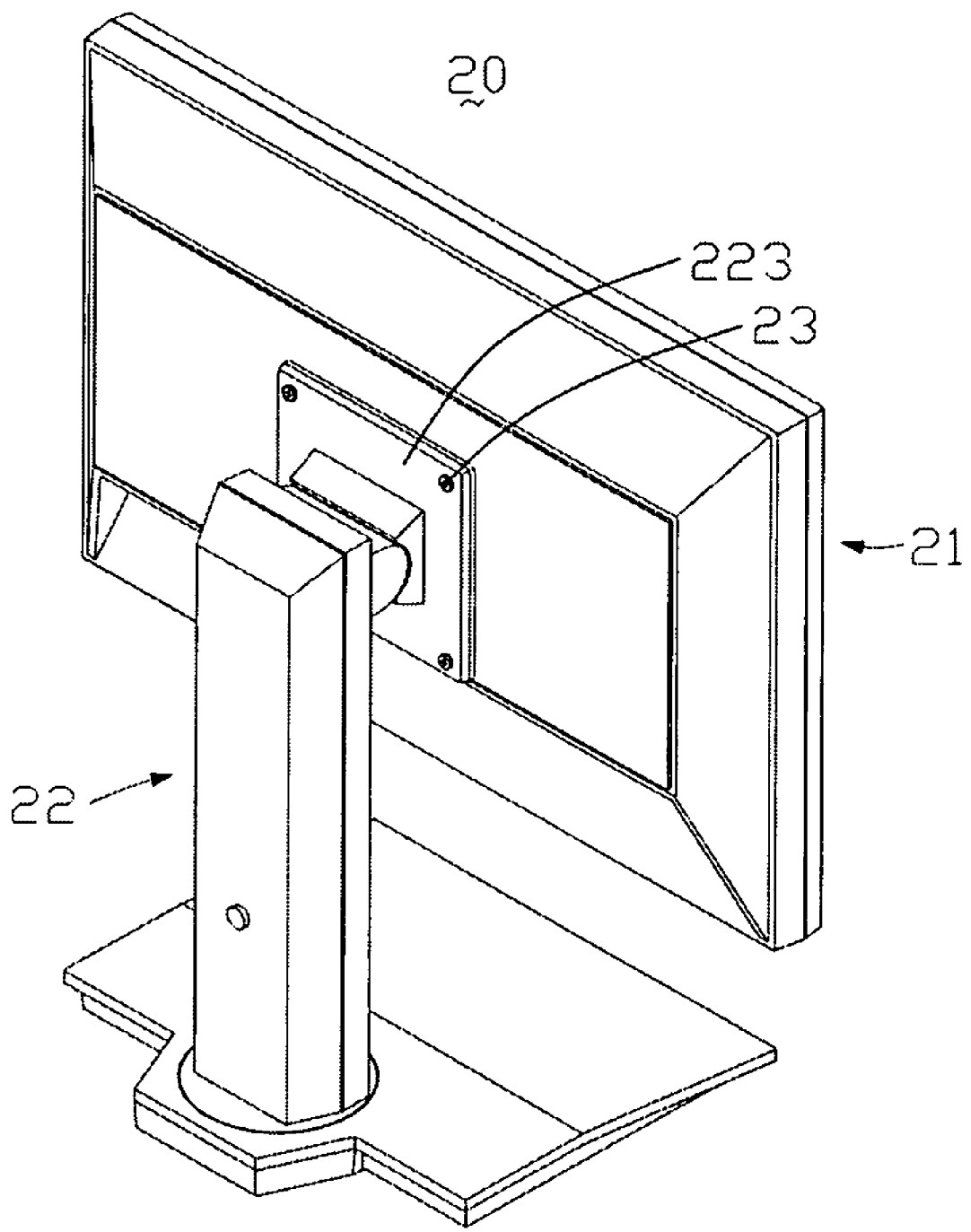
FIG. 5 is an assembled, isometric view of the display device of FIG. 1 viewed from another aspect.

Referring to FIG. 5, after assembly of the fixed pieces 24 to the rear cover 27, the other components can be assembled. The liquid crystal module 26 is received in the front cover 28, and the rear cover 27 is coupled to the front cover 28. The four mounting holes 224 are aligned to the fixing holes 276 of the rear cover 27, and the fasteners 23 pass through the fixing holes 276 and the mounting holes 224, and engage with the fastening holes 243, thus fixing the main body 21 to the support assembly 22.

In the display device 20, during assembly of the fixed pieces 24 to the rear cover 27, the fixed pieces 24 require only the application of external force, a simple and convenient operation requiring no additional tools or apparatus.

Figure 6:
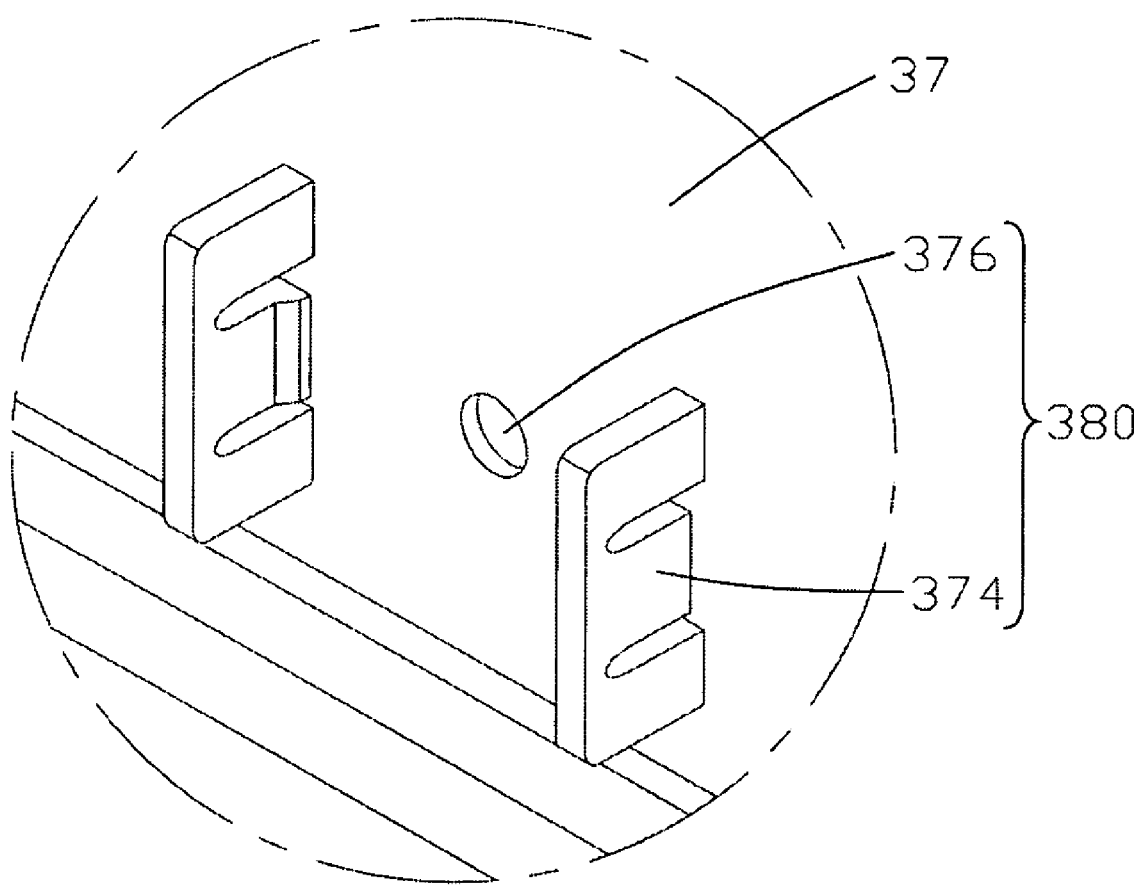
FIG. 6 is an enlarged, partial view of a rear cover of a second embodiment of a display device.
Figure 7:
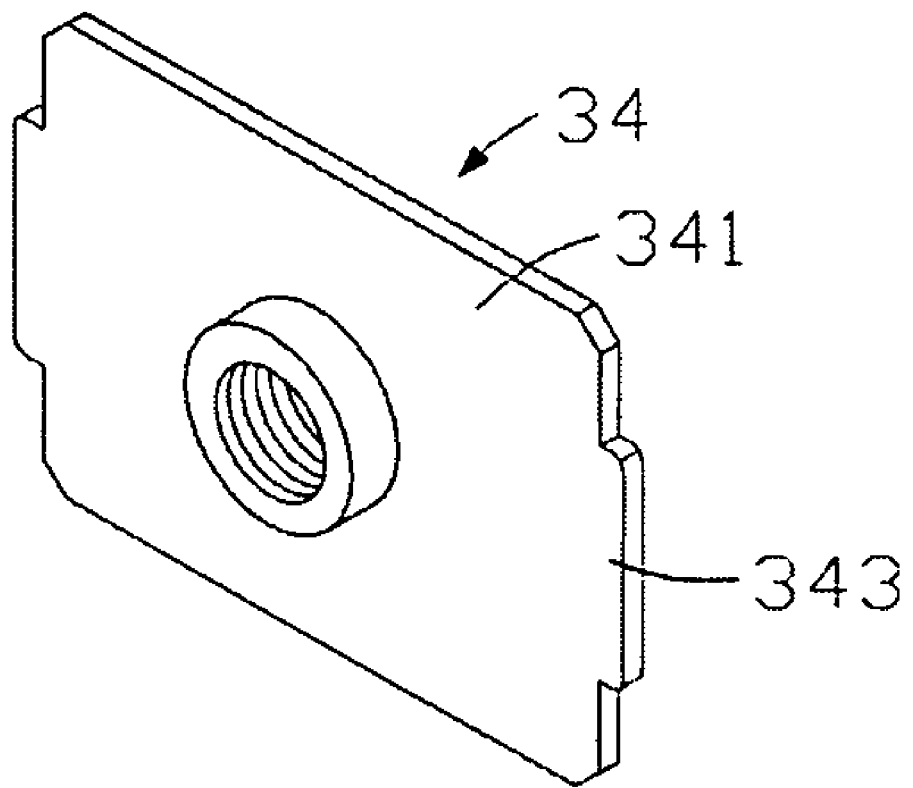
FIG. 7 is an isometric view of a fixed piece of the display device of FIG. 6.
Figure 8:
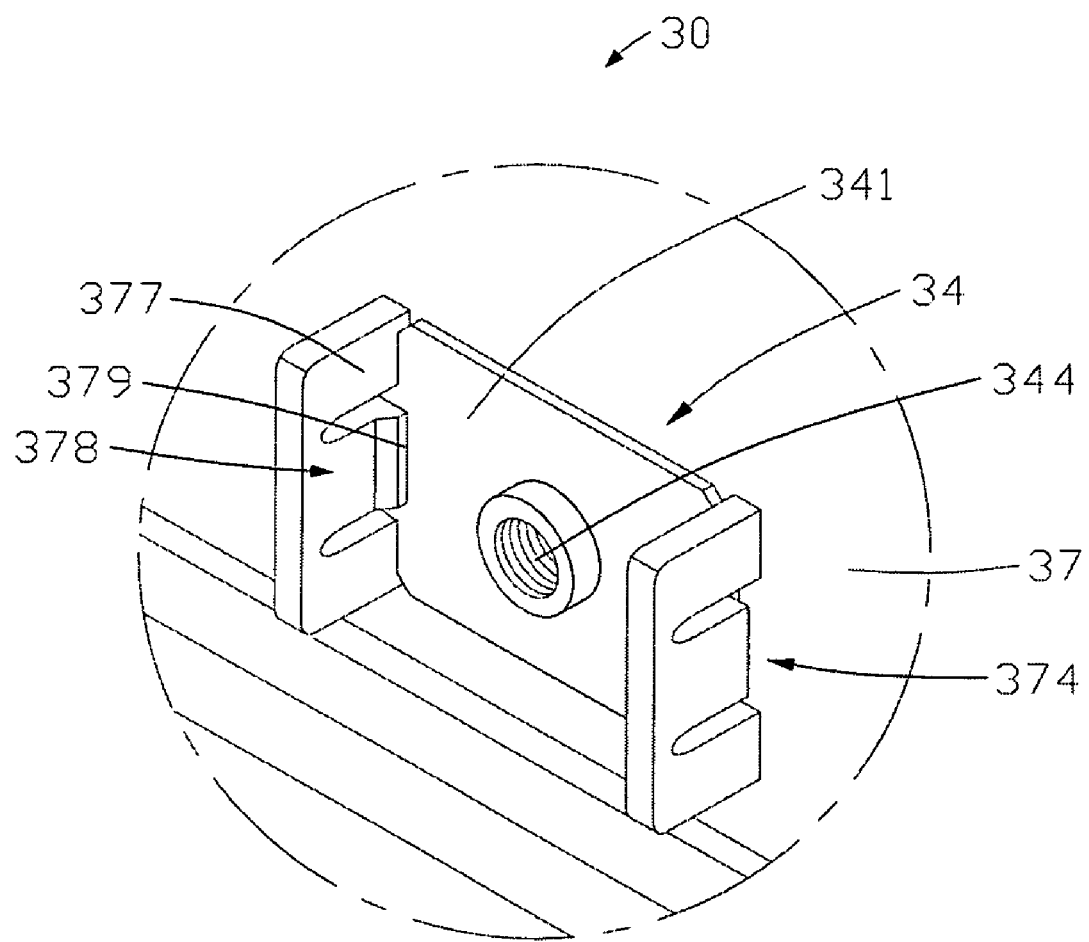
FIG. 8 is an isometric view showing the fixed piece assembled to the rear cover of the display device of FIG. 6.

Referring to FIGS. 6-8, a second embodiment of a display device 30 differs from the display device 20 of the first embodiment only in that a latching unit 380 is different from the latching unit 280 of the first embodiment of the display device 20. The display device 30 includes a rear cover 37 and at least one fixed piece 34. At least one latching unit 380 is formed on the rear cover 37. The latching unit 280 includes two latching pieces 374 and a fixing hole 376. The structure of the latching piece 374 is the same as the latching piece 274. Each latching piece 374 includes a base portion 377 with a gap in the middle and an elastic deformable portion 378 extending from the base portion 377 and into the gap, thus forming an M-shaped latching piece 374. The deformable portion 378 includes a hook 379. Differing from the latching piece 274 of the second embodiment, the latching piece 374 does not include a block. The fixed piece 34 includes a plate 341 and two ears 343 at opposite sides of the plate 341. A width of the ear 343 is less than a gap of the base portion 377. The fixed piece 34 also has a protrusion (not labeled) formed on the plate 341 and defining a fastening hole 344. When the fixed piece 34 is held by the latching unit 380, the ears 343 are latched by the hook 379 and the base portions 377. Similar to the display device 20 of the first embodiment, during assembly of the fixed piece 34 to the rear cover 37, the deformable portions 378 are deformed, and return to their original state once the ears 343 have passed. The ears 343 are locked in the gaps of the base portions 377.

It can be seen that the latching unit 380 is simpler than the latching unit 280. Therefore, the display device 30 is simpler than the display device 20 of the first embodiment.

Figure 9:
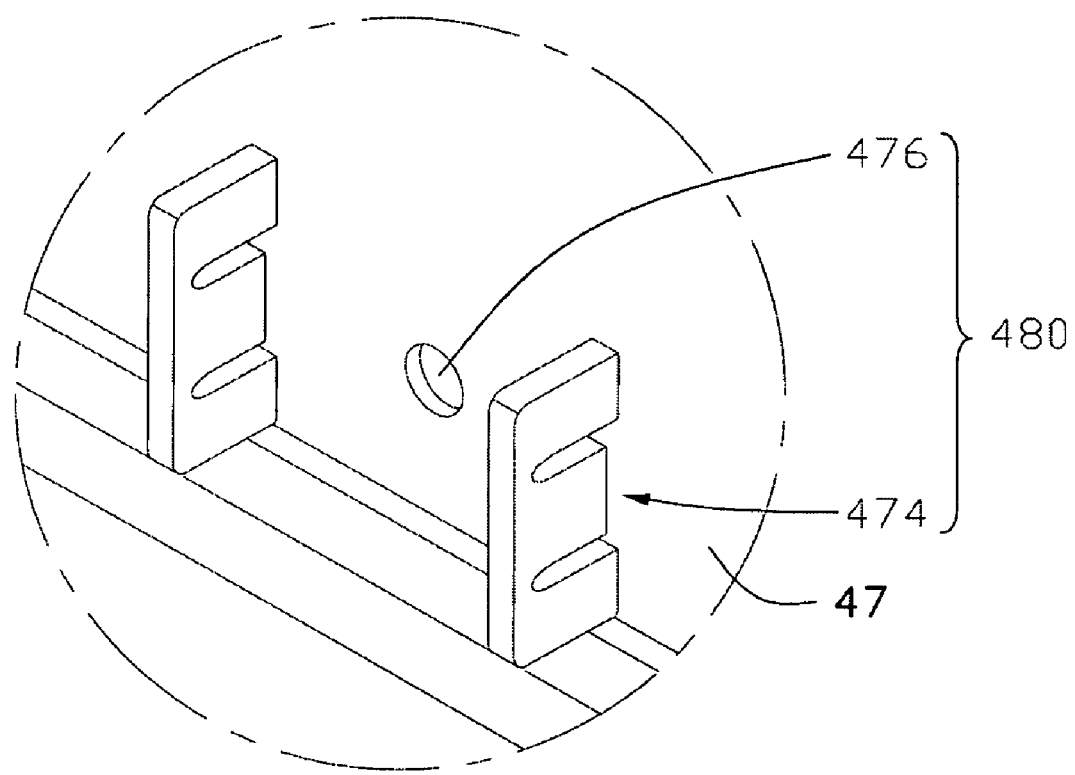
FIG. 9 is an enlarged, partial view of a rear cover of a third embodiment of a display device.
Figure 10:
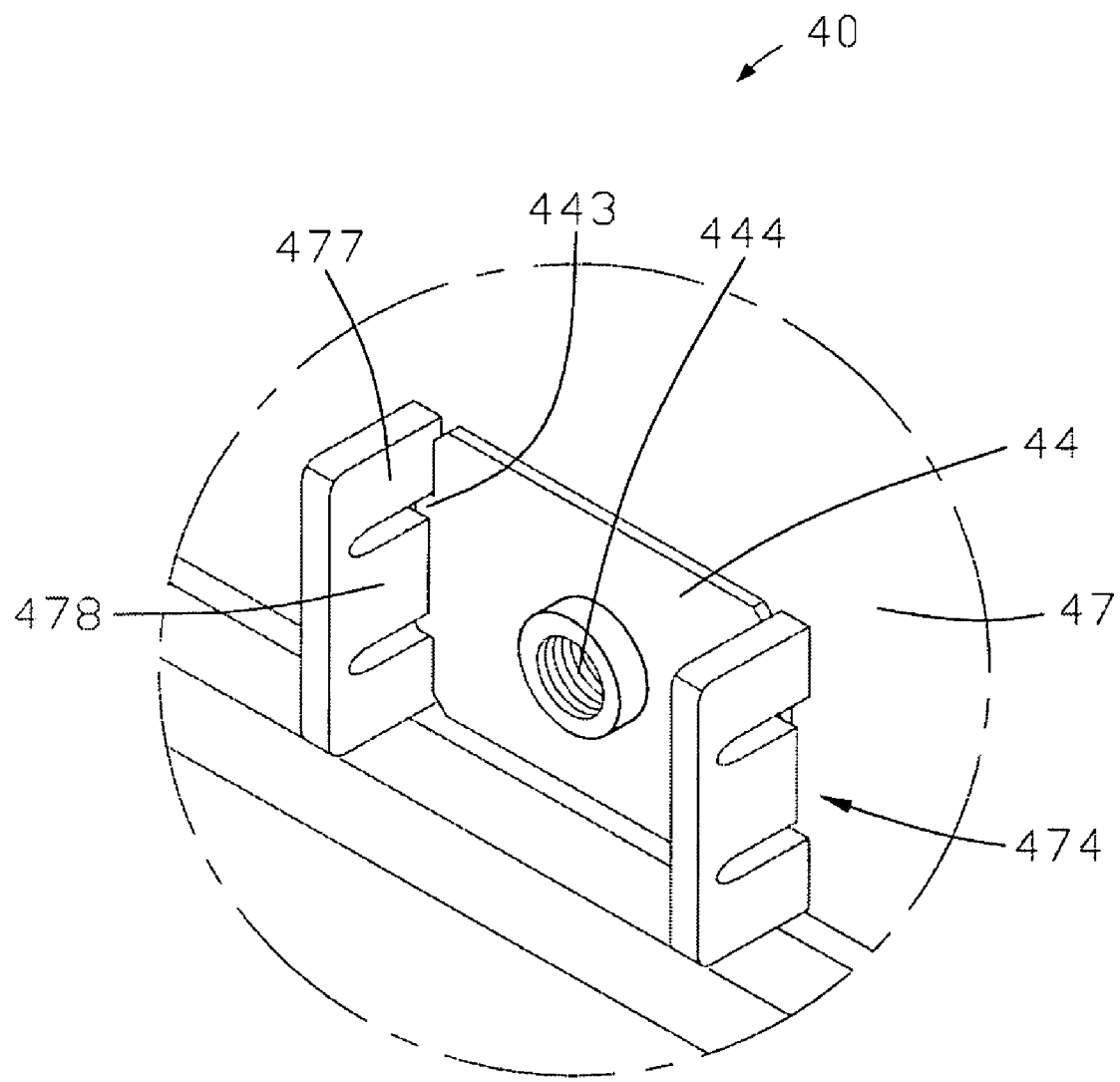
FIG. 10 is an assembled, enlarged, partial view of a rear cover of the display device of FIG. 9.
Figure 11:
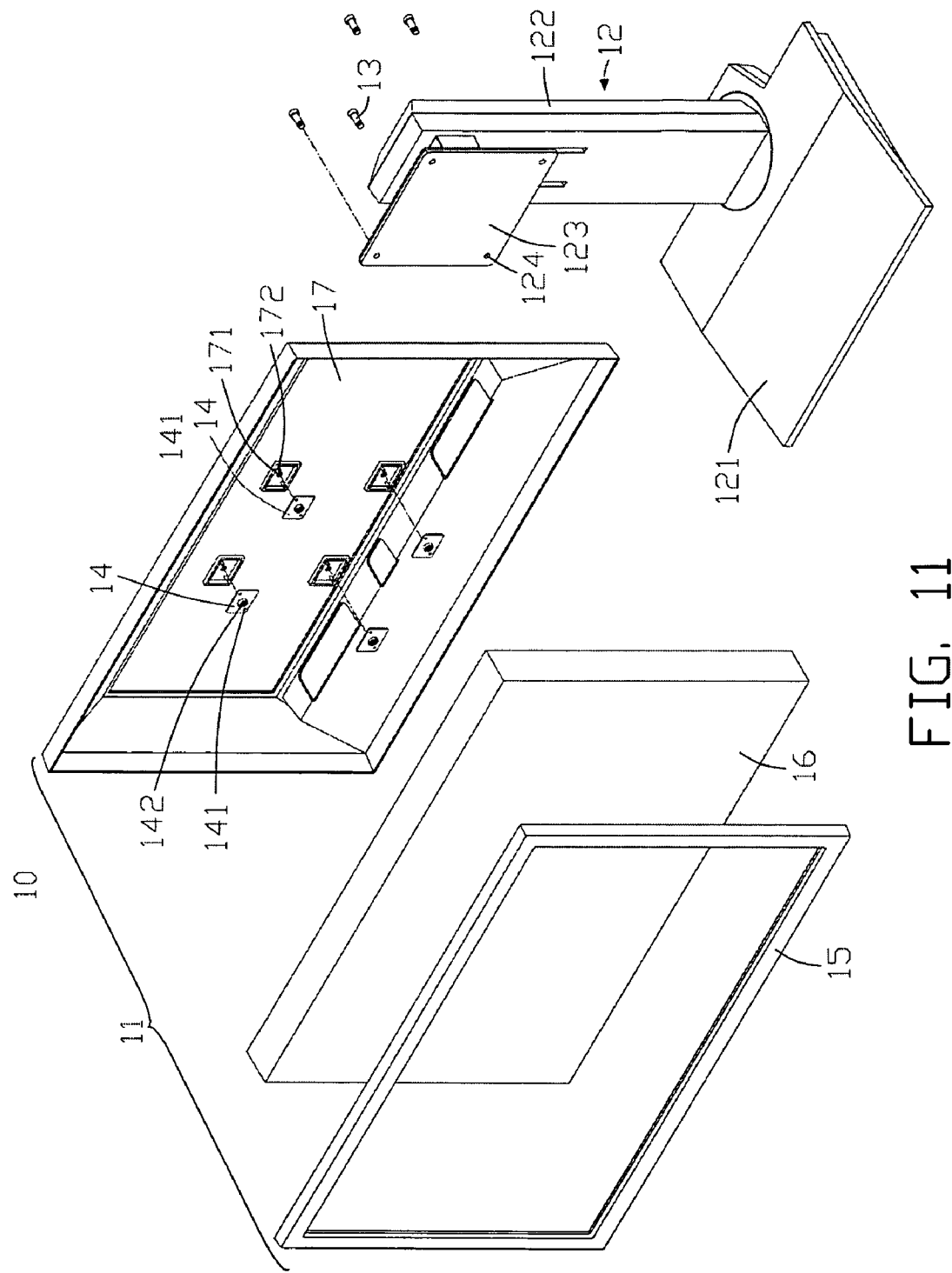
FIG. 11 is an exploded, isometric view of a commonly used display device, the display device including a front cover, a fixed piece, and a rear cover.
Figure 12:
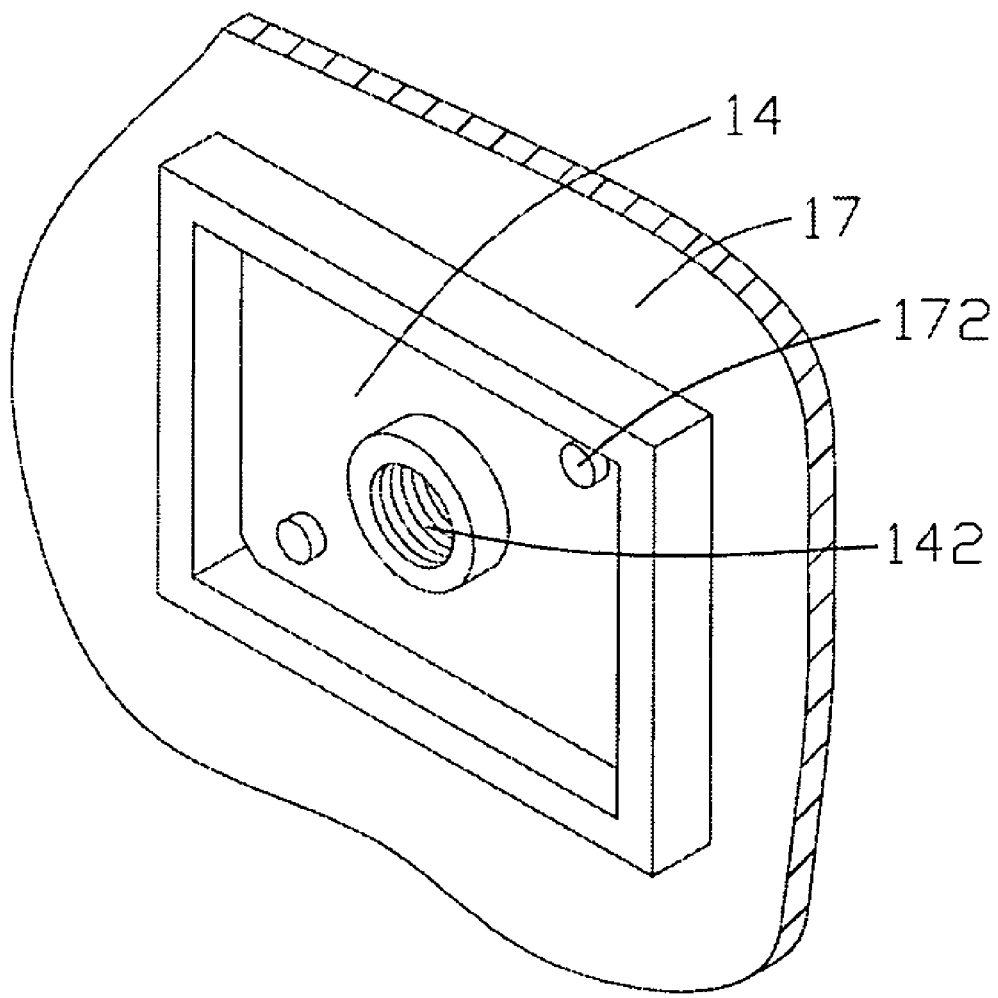
FIG. 12 is an enlarged, partial view showing the fixed piece assembled to the rear cover of FIG. 11.
Figure 13:
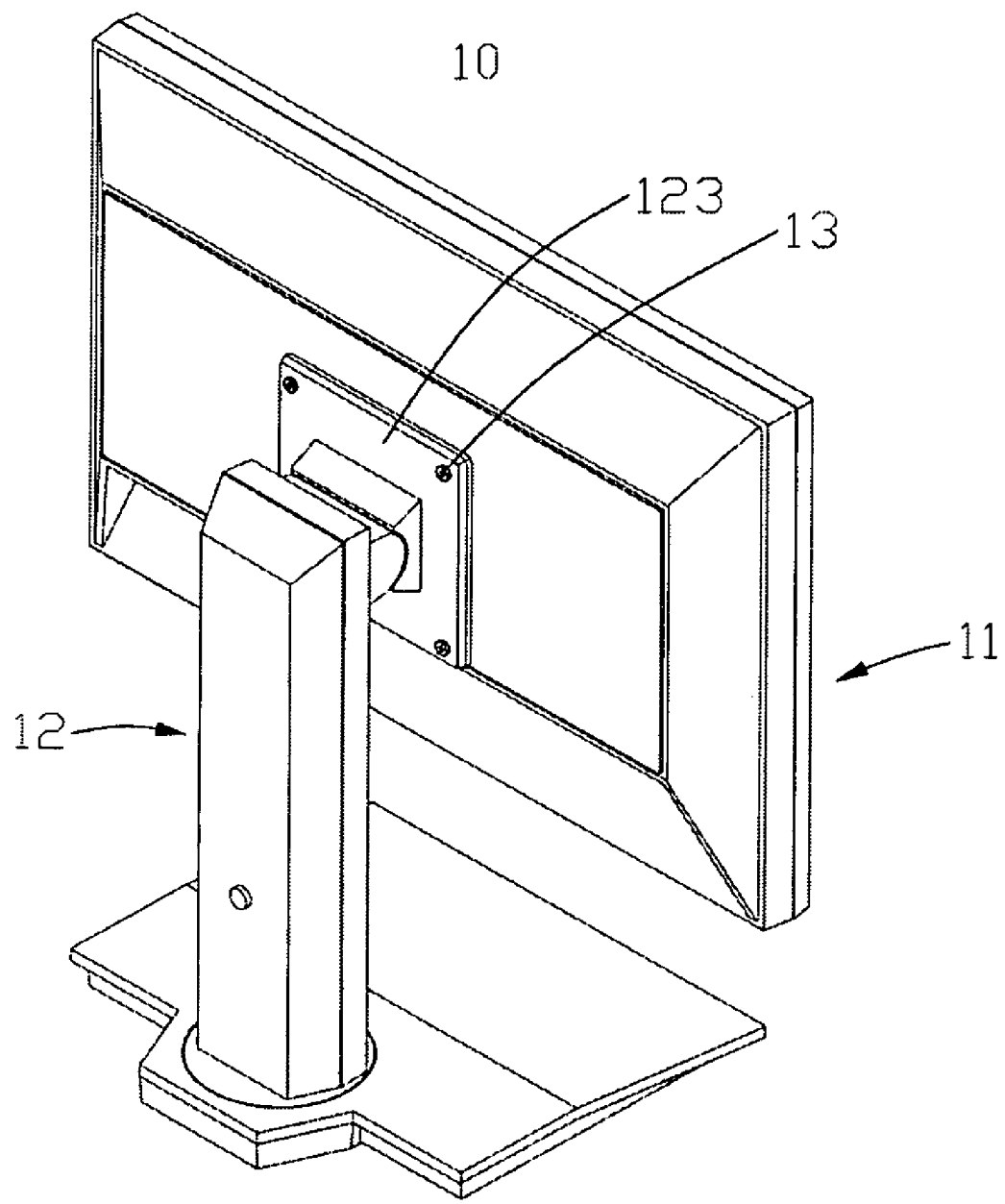
FIG. 13 is an assembled, isometric view of the display device of FIG. 11.

Referring to FIG. 9 and FIG. 10, a third embodiment of a display device 40 is shown, differing from the display device 30 of the second embodiment only in that a deformable portion 478 of a latching piece 474 does not include a hook and the fixed piece 44 is different from the fixed piece 34.

Assembly of the fixed piece 44 is similar to that of the fixed piece 24 and the fixed piece 34. A rear cover 47 of the display device 40 includes at least one latching unit 480 including two opposite latching pieces 474 and a fixing hole 476. The latching piece 474 includes a base portion 477 and the deformable portion 478 in a gap of the base portion 477. The fixed piece 44 includes an ear 443 at each end thereof and defines a fastening hole 444. The ears 443 are latched between the rear cover 47 and the deformable portion 478. Since the deformable portion 478 does not include a hook, the display device 40 of the third embodiment is simpler than the display device of the first two embodiments.

Alternatively, the blocks 275 may not be connected to the latching pieces 274, but at two sides of the latching pieces 274. Two blocks 275 on the same side of the latching pieces 274 may be combined to one, that is, the latching unit 280 may include two blocks 275.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A display device, comprising:
   a main body comprising a liquid crystal module, at least one fixed piece, and a housing to receive the liquid crystal module, the housing comprising a front cover cooperated with a rear cover to define a space to accommodate the liquid crystal module, and at least one latching unit, the rear cover defining at least one fixing hole, the at least one fixed piece defining a fastening hole;
   a support assembly to support the main body, the support assembly comprising a base, a bracket fixed to the base, and a mounting plate fixed to the bracket and the rear cover, the mounting plate defining a mounting hole; and
   at least one fastener capable of engaging in the at least one fixing hole of the rear cover, the fastening hole of the at least one fixed piece, and the mounting hole of the mounting plate to fix the rear cover on the mounting plate;
   wherein the at least one fixed piece is fixed to the main body and the support assembly to connect the main body with the support assembly, and at least part of the at least one latching unit is deformable to allow passage thereby of the at least one fixed piece, whereby the at least one fixed piece is fixed to the main body.

2. The display device of claim 1, wherein the at least one latching unit comprises a plurality of latching pieces to hold the at least one fixed piece, and deformable parts of said at least part of the at least one latching unit are disposed on the latching pieces.

3. The display device of claim 2, wherein the plurality of latching pieces are two latching pieces arranged opposite to each other and the at least one fixed piece is positioned therebetween.

4. The display device of claim 2, wherein each latching piece comprises a base portion with a gap and a deformable portion extending from the base portion, and the deformable portion is the deformable part of the latching piece; and the deformable portion is shorter than the base portion thus forming a gap between the deformable portion and the housing.

5. The display device of claim 4, wherein the at least one fixed piece comprises a plate; the at least one latching unit further comprises a plurality of blocks formed at ends of each latching piece; the deformable portion comprises a hook; the deformable portions of the latching pieces are deformable to allow the at least one fixed piece to pass thereby; and the at least one fixed piece is held by the blocks, the hooks of the deformable portions, and the base portions.

6. The display device of claim 4, wherein the deformable portion comprises a hook; the at least one fixed piece comprises a plate and two ears on different sides of the plate; the deformable portions of the latching pieces deform to allow the ears of the at least one fixed piece to pass thereby; the at least one fixed piece is held by the deformable portions and the base portions, and the ears are positioned in the gaps of the base portions and held by the hooks, with ends of the plate contacting the base portions.

7. The display device of claim 4, wherein the at least one fixed piece comprises a plate and two ears at different sides of the plate; the deformable portions of the latching pieces deform to allow the ears of the at least one fixed piece to pass thereby; the at least one fixed piece is held by the deformable portions and the base portions, the ears are positioned in the gaps of the base portions and held by the deformable portions, and ends of the plate contact the base portions.

8. The display device of claim 1, wherein the rear cover comprises a plurality of sidewalls connected end-to-end, a protruding portion, a plurality of connecting portions, and the at least one latching unit; the connecting portions connect the sidewalls with the protruding portion; and the at least one latching unit is formed on the protruding portion.

9. A display device, comprising:
a main body comprising a liquid crystal module, at least one fixed piece, and a housing to receive the liquid crystal module, the housing comprising a cover and at least one latching unit formed at an inner surface of the cover, each latching unit comprising at least two latching pieces extending from the inner surface of the cover and facing each other thereby defining a space to accommodate the at least one fixed piece, each latching piece comprising two legs formed on the inner surface of the cover and spaced from each other, and a deformable portion extending from a portion of the respective latching piece which corresponds to a region between the two legs, the deformable portion comprising a free end protruding towards the inner surface of the cover without contacting the inner surface of the cover thereby defining a gap between the free end, the two legs and the inner surface of the cover; and a support assembly fixed to the cover to support the main body, the support assembly comprising a mounting plate fixed to an external surface of the cover opposite to the inner surface of the cover;

wherein the at least one fixed piece is fixed to the cover and the support assembly so as to connect the main body with the support assembly, the deformable portions are deformable to allow the at least one fixed piece to pass thereby, and the free end of each deformable portion abuts against an upper surface of a corresponding part of the at least one fixed piece, whereby the at least one fixed piece is fixed to the cover; and wherein the cover defines at least one fixing hole, the at least one fixed piece defines a fastening hole corresponding to the at least one fixing hole, the mounting plate defines at least one mounting hole corresponding to the fastening hole, and at least one fastener is configured to engage in the at least one fixing hole, the fastening hole of the at least one fixed piece, and the at least one mounting hole to fix the cover on the mounting plate.

10. The display device of claim 9, wherein the at least one fixed piece comprises a plate with two first opposite sides and two second opposite sides, the at least one latching unit further comprises a plurality of blocks, each latching piece is sandwiched between a pair of the blocks facing toward each other, the at least two latching pieces are capable of blocking a movement of the at least one fixed piece along a direction vertical to the inner surface, and the blocks are capable of blocking a movement of the at least one fixed piece along a direction parallel to the inner surface.

11. The display device of claim 9, wherein the deformable portion of each latching piece comprises a hook formed at the free end thereof, and the hook is configured to abut against the upper surface of the corresponding part of the at least one fixed piece.

12. The display device of claim 11, wherein the at least one fixed piece comprises a plate and two ears on different sides of the plate; the deformable portions of the latching pieces deform to allow the ears of the at least one fixed piece to pass thereby; and each ear is positioned in the gap between the free end, the two legs and the inner surface of the cover and held by the hook of the corresponding latching piece, with ends of the plate contacting the legs of the latching pieces.

13. The display device of claim 9, wherein the at least one fixed piece comprises a plate and two ears at different sides of the plate, the deformable portions of the latching pieces deform to allow the ears of the at least one fixed piece to pass thereby, and each ear is positioned in the gap between the free end, the two legs and the inner surface of the cover and held by the deformable portions of the corresponding latching piece, with ends of the plate contacting the legs of the latching pieces.

* * * * *